United States Patent
Sonnenmoser et al.

(10) Patent No.: US 10,554,443 B2
(45) Date of Patent: Feb. 4, 2020

(54) PASSENGER TRANSPORT SYSTEM WITH CENTRAL CONTROL UNIT AND MULTIPLE FIELD DEVICES WHICH COMMUNICATE WITH DATA TELEGRAMS PRIORITIZED BY WAITING PERIODS

(71) Applicant: Inventio AG, Hergiswil (CH)

(72) Inventors: Astrid Sonnenmoser, Hochdorf (CH); Ivo Lustenberger, Buttisholz (CH); Thomas Hartmann, Kleinwangen (CH); Adrian Knecht, Döttingen (CH); Kurt Heinz, Buchs (CH)

(73) Assignee: INVENTIO AG, Hergiswil NW (CH)

( * ) Notice: Subject to any disclaimer, the term of this patent is extended or adjusted under 35 U.S.C. 154(b) by 0 days.

(21) Appl. No.: 16/304,322

(22) PCT Filed: Jun. 7, 2017

(86) PCT No.: PCT/EP2017/063798
§ 371 (c)(1),
(2) Date: Nov. 26, 2018

(87) PCT Pub. No.: WO2017/211875
PCT Pub. Date: Dec. 14, 2017

(65) Prior Publication Data
US 2019/0140860 A1    May 9, 2019

(30) Foreign Application Priority Data
Jun. 9, 2016  (EP) .................................. 16173799

(51) Int. Cl.
*H04L 12/40* (2006.01)
*B66B 1/34* (2006.01)

(52) U.S. Cl.
CPC ...... *H04L 12/40163* (2013.01); *B66B 1/3453* (2013.01); *B66B 1/3461* (2013.01);
(Continued)

(58) Field of Classification Search
CPC ........... H04L 12/40163; H04L 12/4013; H04L 2012/40267; B66B 1/3453; B66B 1/3461
See application file for complete search history.

(56) References Cited

U.S. PATENT DOCUMENTS

| 5,854,454 A | 12/1998 | Upender et al. |
| 6,267,219 B1 | 7/2001 | Spannhake et al. |

(Continued)

FOREIGN PATENT DOCUMENTS

| EP | 2251293 A1 | 11/2010 |
| JP | 2001206654 A | 7/2001 |

OTHER PUBLICATIONS

Wikipedia May 27, 2015: "Carrier sense multiple access with collision avoidance and resolution using priorities"; entire document.

*Primary Examiner* — Glenn A. Auve
(74) *Attorney, Agent, or Firm* — William J. Clemens; Shumaker, Loop & Kendrick, LLP

(57) ABSTRACT

A passenger transport system includes a central control unit for controlling system functions, field devices spatially distributed within the system, and a bus system transmitting data between the unit and the devices. The unit and/or the devices detect a current data transmission and the conclusion of the data transmission, and output different types of data telegrams that differ according to urgency. The unit and/or the devices output data telegrams only when no current data transmission is occurring and after a waiting period has elapsed since the conclusion of a previous data transmission. Each type of data telegram is assigned an individual waiting period on the basis of the respective urgency. Thus, a simple transmission prioritization is implemented during the data transmission, wherein each device can transmit data telegrams with different urgency and data telegrams of higher (Continued)

urgency are effectively transmitted with higher priority than data telegrams of lesser urgency.

16 Claims, 2 Drawing Sheets

(52) U.S. Cl.
CPC ...... *H04L 12/4013* (2013.01); *H04L 12/4015* (2013.01); *H04L 2012/40267* (2013.01)

(56) References Cited

U.S. PATENT DOCUMENTS

| | | | |
|---|---|---|---|
| 6,665,601 B1* | 12/2003 | Nielsen | H04L 12/40 |
| | | | 701/50 |
| 2016/0352533 A1* | 12/2016 | Talty | H04L 12/4015 |
| 2018/0097887 A1* | 4/2018 | Koshimae | H04L 67/42 |

\* cited by examiner

PASSENGER TRANSPORT SYSTEM WITH CENTRAL CONTROL UNIT AND MULTIPLE FIELD DEVICES WHICH COMMUNICATE WITH DATA TELEGRAMS PRIORITIZED BY WAITING PERIODS

FIELD

The present invention relates to a passenger transport system, for example, an elevator system, in which a plurality of field devices, such as door switches, safety switches, and the like, are provided, which communicate with a central control unit.

BACKGROUND

Passenger transport systems are most commonly used to transport passengers or objects in buildings or structures. For example, a passenger transport system can be designed as an elevator system. Alternatively, a passenger transport system can be designed as an escalator or a moving walkway.

In the following, possible designs of passenger transport systems or embodiments of the invention shall be explained, in most cases using elevator systems. Analogously, embodiments of the invention can also be implemented in passenger transport systems in the form of moving walkways, escalators, and the like.

In general, elevator systems are used to be able to transport passengers, for example, within a structure between different floors. As a rule, an elevator car can be moved for that purpose within a usually vertical elevator shaft. When the elevator car has reached a desired floor, an elevator door and, if applicable, an associated landing door can be opened in order to allow passengers to enter the elevator car or to exit the elevator car.

Functions of the elevator system, such as actuating the drive which moves the elevator car, are usually controlled by a central control unit. The central control unit can particularly also control safety-relevant functions of the elevator system. For that purpose, a safety monitoring unit as part of the control unit or in communication with the control unit can be provided. For example, the central control unit can take into account information that it can receive by processing sensor signals or sensor data. The functions of the elevator system can also be controlled by more than one control unit, for example, by a control unit which, among others, controls the drive, and a further control unit which monitors safety functions. In the following, a central control unit shall refer to any control unit that processes sensor signals and/or generates control signals. The sensor signals or sensor data, for example can originate particularly from door switches or other safety switches which are distributed in the structure receiving the elevator system and, for example, detect or measure locally prevailing conditions or states. In the following, such devices shall be called field devices.

Furthermore, the control unit itself can generate control signals and transmit them to other devices distributed within the structure which, for example, can have actuators implementing the control signals. The actuator can purposefully influence locally prevailing conditions or states. Alternatively, the actuators can, for example, also output information, e.g. optically or acoustically. In the following, devices having actuators shall also be called field devices.

In modern elevator systems, data or signals are transmitted by means of bus systems, sometimes also called "fieldbus systems" or "fieldbuses" for short, between the field devices and the central control unit. As a result, a wiring between the field devices and the central control unit can be simplified and/or data transmission times can be kept short particularly in very large elevator systems, for example, in high buildings.

EP 2 251 293 A1 describes a conventional elevator control device with a fieldbus interface.

U.S. Pat. No. 6,267,219 B1 describes a conventional elevator control device with a fieldbus in the form of a CAN bus.

SUMMARY

There can be a demand for a passenger transport system, in which communication between a central control unit and field devices of the passenger transport system can be executed quickly and reliably. In particular, there can be a demand for a passenger transport system, with which it is possible to transmit prioritized different types of data and information quickly and in accordance with their urgency, wherein it is simultaneously ensured that data and information with comparatively lesser urgency can also be transmitted safely. In particular, there can be a demand for a simply realized prioritization. Furthermore, there can be a demand for a cost-efficient passenger transport system, particularly a passenger transport system with a cost-efficient data communication option. Furthermore, there can be a demand for a method for transmitting data within a passenger transport system, a computer program product which instructs a computer to execute or control such a method, and a machine-readable medium with said computer program product stored therein.

A first aspect of the present invention relates to a passenger transport system. The passenger transport system has a central control unit, a plurality of field devices, and a particularly serial bus system. The central control unit is used to control functions of the passenger transport system. The field devices are spatially distributed within the passenger transport system. The bus system is designed to transmit data between the central control unit and the field devices. Each field device is designed to output data via the bus system to the central control unit and/or to a different field device. Alternatively, or additionally, the central control unit is designed to output data via the bus system to one of the field devices. The central control unit and/or the field devices are designed to detect the presence of a current data transmission via the bus system and the conclusion of a data transmission via the bus system. The central control unit and/or the field devices are designed to output different types of data telegrams via the bus system. The different types of data telegrams differ with respect to their urgency. The central control unit and/or the field devices are designed to output their own data telegrams via the bus system only, when no current data transmission is occurring via the bus system, and a waiting period has elapsed since the conclusion of a previous data transmission via the bus system. In the process, each type of data telegram is assigned an individual waiting period on the basis of the respective urgency of the type of data telegram.

One type of data telegram is assigned particularly an individual waiting period which starts directly upon conclusion of a previous data transmission via the bus system. However, it is also possible that the waiting period observed after the conclusion of a previous data transmission via the bus system consists of two parts. The first part is the time between the conclusion of a previous data transmission via the bus system and the moment, at which a data telegram is supposed to be output via the bus system. This first part is followed by a second part, the length of which depends on the type of data telegram.

The central control unit and/or the field devices are designed to vary the urgency assigned to a type of data telegram on the basis of current conditions. This is also supposed to mean that also only the urgency of one individual data telegram is varied.

In other words, the urgency assigned to a type of data telegram does not have to be fixed under all conditions, but instead, it can be provided that the control unit or the field device, which intends to transmit such a data telegram, can situationally determine or vary, particularly increase, the urgency of such a data telegram or this type of data telegram.

With the aforementioned increase of urgency, it is ensured that data telegrams, which are basically assigned a lower urgency, can be transmitted safely.

The central control unit or the field devices can be designed to be able to determine on its own the current conditions to be taken into account for the varied determination of the urgency. Such conditions can depend on current operating characteristics of the passenger transport system and/or its components.

In particular, the control unit or a field device can determine that several attempts to output a data telegram of lower urgency have already failed because currently more urgent data telegrams had to be transmitted, and can subsequently temporarily increase the urgency of its data telegram to be transmitted. For example, the control unit or a field device can temporarily increase the urgency of the aforementioned data telegram after two to ten, particularly after three to five, failed attempts to output a data telegram of lesser urgency. The urgency is increased particularly only until the moment when the data telegram was successfully output.

Alternatively, or additionally, the current conditions, on the basis of which the urgency of a data telegram is supposed to be varied, can also reflect environmental influences or environmental conditions. For example, there can be different types of instant messages which, depending on such environmental conditions, are to be ranked with different urgencies. For example, at specific times of day or at specific climatic conditions, some instant messages can be treated so as to be more urgent than at other times of day or climatic conditions.

Possible features and advantages of embodiments of the invention can be considered, among others and without limiting the inventors, to be based on the ideas and knowledge described in the following.

As was briefly noted at the beginning, a central control unit usually communicates in modern passenger transport systems with a plurality of field devices. If necessary, the field devices can also communicate with one another. In order to simplify the communication and particularly the infrastructure required hereto, serial bus systems are used most often. In such a bus system, the central control unit is not necessarily connected separately to each individual field device by means of individual wiring, and so, for example, a multiplicity of cables essentially connected parallel to one another would have to be provided. Instead, a plurality of field devices can, for example, exchange data with the central control unit and, if necessary, also with one another via a common wiring or a central data cable. A chronological sequence and a manner, with which data are transmitted via commonly used areas or cables of the bus system, are controlled by a specific data transmission protocol.

For example, field devices in the passenger transport system can be designed to output sensor data generated by a sensor to the central control unit via the bus system. The sensor can be part of the field device. Alternatively, the sensor is only connected to the field device, and so the field device is used as a type of data transmission node for the sensor. Sensors can be designed to detect different physical variables in order to be able, for example, to permanently or periodically monitor parameters relevant for the safety of the passenger transport system.

Alternatively, field devices can have one or more actuators in order to be able to execute or suitably influence specific activities within the passenger transport system. For that purpose, the central control unit can be designed to output control data via the bus system to one of the field devices to be implemented by an actuator. In turn, the actuator can be part of the field device or merely connected to the field device.

In the concrete example of a passenger transport system in the form of an elevator system, sensors forming field devices can be attached, for example, in a shaft head, a shaft pit, or a shaft floor of an elevator shaft but also on or on top of an elevator car. Each sensor can be used to detect or monitor local states, variables or parameters within the elevator system.

For example, door sensors can monitor a current closing state of an elevator door or a landing door, and so it is possible to communicate to the central control unit by transmitting corresponding data, whether the elevator door or a specific landing door is currently open or closed. Alternatively, or additionally, sensors can be provided in an elevator system which, for example, can determine, whether objects, such as ladders, are located correctly stored in the positions provided for their storage within the elevator shaft, whether persons, for example, maintenance personnel, are present within the elevator shaft, etc.

Actuators controlled by the central control unit can be provided in an elevator system, for example, to output in an optical or acoustical manner, for example, information or warning signals. Mechanical variables within the elevator system can be influenced, for example, by means of mechanically operating actuators.

A correct functioning of the field devices used in a passenger transport system can be essential for a functioning of the passenger transport system and particularly for the safety of the passenger transport system. As a rule, it must thus be ensured that each of the field devices functions flawlessly, and that it is possible to exchange data with the central control unit via the bus system. In addition, a data communication within the passenger transport system should be able to take place such that, particularly for the safety of the passenger transport system, relevant data are communicated sufficiently fast from one of the field devices to the central control unit, or vice versa.

In general, as initially stated, a manner, with which data are communicated via the bus system between the central control unit and the field devices, is predefined by a protocol controlling the data transmission. Among others, it is controlled, whether or when a field device is allowed to communicate with the control unit, i.e. whether or when it is allowed to distribute or send a data telegram via the bus system. In general, the protocol provides that a current data transmission is not supposed to be interrupted. The control unit and the field devices are thus preferably designed to detect, whether a data transmission via the bus system is currently taking place, and to wait until the current data transmission is completed, before, if necessary, attempts are made to transmit data of their own via the bus system.

If, for example, a plurality of field devices or the control unit intend to transmit data simultaneously via the bus system to the central control unit and/or to the other field devices, it must further be controlled which data are supposed to be transmitted prioritized via the bus system, i.e., which field device or whether the control unit can first send its data via the bus system.

In conventional bus systems, such as the serial CAN bus system (CAN—controller area network), the decision regarding prioritization of data transmissions between the field devices and the central control unit is most often executed on the basis of fixed criteria. For example, in the CAN bus system frequently used in vehicles, data transmissions are often prioritized on the basis of an object identifier of each data telegram. Said object identifier identifies the contents of the data telegram and not the transmitting field device. In general, a data telegram with a lower object identifier is transmitted prioritized via the bus system prior to data telegrams with a higher object identifier. For that purpose, each field device can monitor the bus, while it is in the process of transmitting a data telegram with an object identifier. If two field devices transmit simultaneously, the first dominant bit of one of the two data telegrams overwrites the corresponding recessive bit of the other one, which the field device transmitting said other data telegram is able to detect and subsequently can end its transmission attempt. With such a method, a hierarchy of messages or data transmissions among themselves can be predetermined. The hierarchy is message-specific, i.e., a message with a lower object identifier will, as a rule, always be transmitted with priority over messages or data telegrams with a higher object identifier. In such a system, it must generally be decided beforehand, i.e., when the entire system is designed, which message or data telegram, as a rule, contains time-sensitive data and is thus supposed to receive a high priority for the data transmission; subsequently, said data telegram is assigned a low object identifier.

For the functioning of the described prioritization, it is required that each object identifier exists precisely only once. If each field device transmits only one data telegram each, a prioritization is assigned to each field device by the object identifier of the data telegram transmitted by the field device. However, particularly in passenger transport systems, it can frequently be the case that a generally accurate prioritization of field devices does not appear to be meaningful for the data transmission with the central control unit.

For example, in an elevator system, a plurality of field devices can be installed which, for example, are supposed to monitor both the opening and closing state of landing doors. Since, for a safe operation of the elevator system, it is generally necessary that all landing doors of the elevator system are closed prior to a movement of the elevator car, the data of all field devices monitoring the corresponding closing states are equally important, i.e., each of the field devices should be able to transmit its information that a landing door, for example, is not correctly closed, with equal urgency to the central control unit.

On the other hand, it can be necessary especially for passenger transport systems that field devices are able to transmit different types or kinds of data telegrams to or receive from the central control unit. The types of data telegrams can differ with respect to their content. In particular, the types of data telegrams can differ with respect to the urgency, with which they are supposed to be transmitted via the bus system. In other words, a plurality or all of the field devices provided in a passenger transport system can be designed to be able to transmit, appropriate to the situation, both data telegrams with high priority via the bus system and, for example, less important data telegrams with low priority via the bus system.

In a passenger transport system, particularly a passenger transport system in the form of an elevator system, the field devices can be designed, for example, to be able to exchange with the central control unit so-called instant messages as well as so-called sporadic test messages and so-called cyclic test messages via the bus system. The instant messages indicate a change of state at the field device or a sensor associated with such a field device. It is supposed to be possible to transmit instant messages with a high urgency. Sporadic test messages indicate a result of a complex review of a functionality of the field device, and they are supposed to be transmitted with medium urgency. Cyclic test messages only indicate a result of a simple review of a functionality of the field device and are supposed to be transmitted via the bus system at a relatively low urgency.

In the example of an elevator system, instant messages can indicate, for example, that the status of a sensor or switch monitoring a closing state of a landing door has changed. Generally, such a change in status is not temporally predictable. Since it relates to a safety-relevant aspect of the elevator system, it is supposed to be transmitted to the control unit spontaneously and with high urgency in order for the control unit to detect, for example, that currently not all landing doors are correctly closed and to prevent that the elevator car is moved.

In addition, each of the field devices, for example, can be subject to a complex review of its functionality at specific intervals during the operation of the elevator system. For that purpose, different functions of the field device can be reviewed. For example, it can be reviewed, whether sensors, switches, etc. of the field device react correctly to changing marginal conditions or changing ambient conditions and transmit corresponding data. Such complex transmissions take place relatively rarely, i.e., at comparatively long intervals, but their results are relevant for a safe operation of the elevator system and should thus be transmitted via the bus system with at least medium urgency.

In the elevator system, it can further be provided that a functionality of the field devices is subject to at least one simple review at relatively short intervals. For example, a simple review can at least monitor, whether a field device is still correctly connected to the bus system, or whether it can no longer communicate with the bus system due to an unintended interruption of a data line. Such a simple review can further monitor, whether the field device is still supplied with energy and can thus operate. The simple reviews are executed relatively often, but since the risk that they detect a faulty state of a field device is relatively low, cyclic test messages conveying review results can be transmitted via the bus system with a comparatively low urgency.

In order to make it possible for each field device during data transmission within a passenger transport system to output via or receive from the bus system different types of data telegrams, and in order to take into account an urgency, with which a specific type of data telegram is supposed to be transmitted, it is proposed that the central control unit and/or the field devices are each not only designed to detect, whether data is currently transmitted via the bus system, but to also detect, when and if a data transmission via the bus system was completed. Contrary to data transmissions executed conventionally with bus systems, each field device is not supposed to immediately attempt to transmit its own data. Instead, the field devices are supposed to attempt to output their own data telegrams via the bus system only, when a specific waiting period has elapsed since the conclusion of a previous data transmission via the bus system. The waiting period is supposed to be selected on the basis of the type of data telegram, and thus on the basis of the urgency of this specific type of data telegram. As a result, a particularly simple realization of a prioritization of the data telegrams is possible.

In other words, a field device, which, for example, is supposed to transmit a data telegram of the type with high urgency, is supposed to wait for a shorter waiting period after detecting the conclusion of a previous data transmission, until it starts its data output via the bus system than a different field device which is only supposed to transmit a data telegram of a less urgent type.

As demonstrated concretely in the above example, an elevator system is supposed to be able to transmit instant messages between its central control unit and its field devices with a higher urgency than is the case for sporadic test messages or cyclic test messages. A first field device that detects a status change and correspondingly intends to transmit an instant message to the central control unit thus only waits for a short waiting period after the conclusion of a previous data transmission, before it attempts to output its own instant message via the bus system to the central control unit. A second field device, which simultaneously intended to transmit a sporadic test message or a cyclic test message to the central control unit, will wait for a longer waiting period, and so at the moment, at which the second field device attempts to output its less urgent test message, the first field device has already started to transmit its instant message via the bus system. The second field device thus detects that data is currently transmitted and must therefore wait, until said urgent data transmission is completed.

As a result, the urgent instant message, due to the fact that it is to be transmitted with a shorter waiting period to be observed, can be output via the bus system prior to the test message to be transmitted with a longer waiting period, and thus effectively enjoys a higher prioritization.

According to an embodiment, the bus system, the central control unit, and the field devices are designed to communicate data at a specific data transfer rate. The individual waiting periods of types of data telegrams with different degrees of urgency differ by at least the duration required for transmitting one individual data unit at the specific data transfer rate. Preferably, the different individual waiting periods even differ by at least four times the duration required for transmitting one individual data unit at the specific data transfer rate.

In other words, the waiting periods $T_1$, $T_2$, $T_3$ of different data telegrams, which differ with respect to their urgencies, are supposed to differ from one another with respect to their duration at least to the extent that, in view of the data transfer rate used in the passenger transport system, it is distinguishable for the components of the passenger transport system. For example, if the transmission of one individual data unit already requires a specific transmission duration $\Delta t$, the waiting periods $T_1$, $T_2$, $T_3$ of different data telegram types are supposed to differ by waiting period differences $\Delta T$ which are equal or greater, preferably even significantly greater, than said transmission duration $\Delta t$ because it is possible that shorter waiting period differences cannot be safely detected by the devices used in the elevator system. This means that $T_1+\Delta T=T_2$ and $T_2+\Delta T=T_3$, wherein $\Delta T \geq \Delta t$, preferably $\Delta T \geq 2*\Delta t$ or even $\Delta T \geq 4*\Delta t$. One individual data unit can be a single bit or possibly also a sequence of bits, for example, one or more bytes, and is supposed to be able to transport a single information within the passenger transport system. The higher a data transfer rate to be used in the elevator system is, the shorter the transmission duration $\Delta t$, and the shorter the differences $\Delta T$ can generally be between the waiting periods used for different data telegram types.

According to a specific embodiment, the bus system, the central control unit, and the field devices can be designed, for example, to communicate data at a data transfer rate of 9600 baud (=bit/s). In such case, the different individual waiting periods are supposed to differ by at least 1 ms, preferably at least 2 ms.

In the above example, the waiting period for instant messages, for example, could be 3 ms, the waiting period for sporadic test messages, for example, could be 5 ms, and the waiting period for cyclic test messages, for example, could be 7 ms.

According to an embodiment, a plurality of field devices of the elevator system is, with respect to their hardware, designed similarly, and each is designed to output via the bus system different types of data telegrams which differ with respect to their urgency.

In other words, this embodiment relates particularly to the frequently occurring event in passenger transport systems that a plurality of field devices is essentially designed similarly and supposed to be able to communicate with the central control unit with "equal ranking" within the passenger transport system.

For example, many field devices in the form of door switches or door sensor in an elevator system can each monitor a landing door assigned to them with regard to its closing state, wherein the monitoring of a specific landing door is not more important or more urgent than the monitoring of a different landing door.

Each of these basically equally ranked field devices is supposed to be able to differentiate between different types of data telegrams and to output them with different urgency via the bus system.

For example, the field device designed as a door switch can signal a status change of the landing door monitored by said field device as instant message with high urgency to the central control unit, while results of a sporadic complex review or a frequently executed simple review only need to be transmitted with lower urgency to the central control unit.

For that purpose, the field devices can be designed essentially similarly, particularly with respect to their hardware. As a result, costs for a production of differently designed field devices and particularly also regarding accompanying more complex logistics during production, storage, and/or installation of such different field devices can be avoided.

According to an embodiment, the central control unit and/or the field devices are designed to output data telegrams of a type of higher urgency via the bus system less frequently than data telegrams of a type of lower urgency.

In other words, with regard to their associated urgencies, the data telegram types should preferably be selected such that data telegrams which, for example, are particularly important for the safety of the elevator system, only need to be transmitted infrequently but with high urgency, while data telegram types, which are only supposed to repeatedly monitor the functionality of the entire data communication system used in the elevator system, are supposed to be transmitted frequently, but their transmission is not particularly urgent and can thus at least occasionally take second place to more urgent data transmissions.

With a corresponding weighting of the urgencies of different data telegram types and the associated waiting periods to be observed, the entire data transfer in the passenger transport system can be provided with an easily implemented option of prioritizing important data transmissions.

According to an embodiment, the central control unit, the field devices and/or the bus system are designed to verify, in case of an attempt to output a data telegram, whether a different field device or the control unit is simultaneously attempting to output a data telegram via the bus system, and in such case decide by means of prioritization criteria, which of the data telegrams will be output via the bus system.

In other words, for the data communication provided herein for a passenger transport system and the components used for said data communication in a passenger transport system, the event that, despite said prioritization measures, two or more field devices in the passenger transport system attempt simultaneously to transmit data telegrams via the bus system, is also supposed to be taken into account, in addition to the option of providing a specific prioritization for the transmission of different data telegrams on the basis of waiting periods to be observed. This can particularly occur when two field devices each want to transmit data telegrams of equal urgency, and thus both attempt to send their data telegram after conclusion of a previous data transmission. In such case, further prioritization criteria are supposed to decide which of the field devices is allowed to output its data telegram via the bus system, and which one will have to wait.

Such prioritization criteria can take into account different influencing factors. In one case, the prioritization criteria can evaluate identification numbers of the field devices or the content of the message telegrams. For example, field devices with a low identification number can take priority. If two field devices transmit simultaneously, it is also possible that the first dominant bit of one of the two data telegrams overwrites the correspondingly recessive bit of the other data telegram, which the field device transmitting this data telegram can detect and subsequently end its transmission attempt. This approach is comparable to the above described prioritization with a CAN bus, except that in this case, no object identifiers are compared. It is also possible to use other device-specific prioritization criteria. Alternatively, or additionally, it is possible to use prioritization criteria which are independent from the corresponding field device and instead take into account, for example, environmental influences, a time of day, or the like.

A second aspect of the present invention relates to a method for transmitting data telegrams via a bus system between a central control unit and one or more field devices within a passenger transport system. For that purpose, the central control unit and/or the field devices are designed to output different types of data telegrams via the bus system, which differ with respect to their urgency. The method has at least the following steps: At first, it is detected, whether a current data transmission via the bus system takes place, and when a previous data transmission via the bus system was concluded. A data telegram of a specific type is output via the bus system only if no current data transmission via the bus system takes place, and after a waiting period has elapsed since the conclusion of a previous data transmission via the bus system. Each type of data telegram is assigned an individual waiting period on the basis of the respective urgency of said data telegram type, wherein the urgency assigned to a type of data telegram can be varied on the basis of current conditions.

In other words, the method for transmitting data telegrams within the passenger transport system can be specifically designed to execute the data communication within a passenger transport system in the same manner as was described above with reference to embodiments according to the first aspect of the present invention. Conversely, according to the first aspect of the present invention, a passenger transport system can also be considered to be designed to be able to execute an embodiment of the method according to the second aspect of the present invention.

Taking into account individual waiting periods on the basis of the type of data telegram during the data transmission via the bus system can allow for a prioritization of data telegram transmissions on the basis of their urgency in an easily implemented manner.

Preferably, the individual waiting period of types of data telegrams with different degrees of urgency differ by at least the duration required for transmitting individual data units at a specific data transfer rate within the bus system.

The urgency assigned to a data telegram is increased particularly temporarily if several attempts to send the data telegram have failed.

According to a third aspect of the present invention, a computer program product is proposed that has machine-readable commands which instruct a computer during their execution to execute or correspondingly control a method according to an embodiment of the aforementioned second aspect of the invention.

For that purpose, the computer, for example, can be part of a programmable control unit of the passenger transport system. Alternatively, or additionally, the computer or parts thereof can also be integrated in corresponding field devices of a passenger transport system. The term computer is supposed to have a broad meaning and comprise, for example, processors, CPUs, or the like. In addition, storage media can be provided in order to be able to feed data to or store data for the computer. The computer program product can be formulated in any machine-readable language.

According to a fourth aspect of the present invention, a machine-readable medium is described which has a stored computer program product according to an embodiment of the aforementioned third aspect of the invention.

In other words, the machine-readable medium can be any medium, in which machine-readable commands can be stored temporarily or permanently and which can be read out by a computer. The machine-readable commands can be stored in a different physical manner, for example, in magnetic form, optical form, electric form, etc. For example, the machine-readable medium can be a CD, a DVD, a flash memory, a ROM (read-only memory), a PROM (programmable ROM), an EPROM (erasable PROM), etc. The machine-readable medium can also be part of a larger data-storage unit, such as a server or even the internet, from which the computer program product stored therein can be downloaded.

It must be noted that some of the possible features and advantages of the invention herein are described with reference to different embodiments, particularly partially with reference to a passenger transport system, and partially with reference to a data transfer method to be executed in said passenger transport system. A person skilled in the art knows that the features can be combined, adjusted, or exchanged in a suitable manner in order to arrive at further embodiments of the invention.

In the following, embodiments of the invention shall be described with reference to the attached drawings, wherein neither the drawings nor the description are to be interpreted as limiting the invention.

The drawings are merely schematic and not true to scale. Similar reference signs in the different drawings denote similar or similarly functioning features.

DETAILED DESCRIPTION

Figure 1:
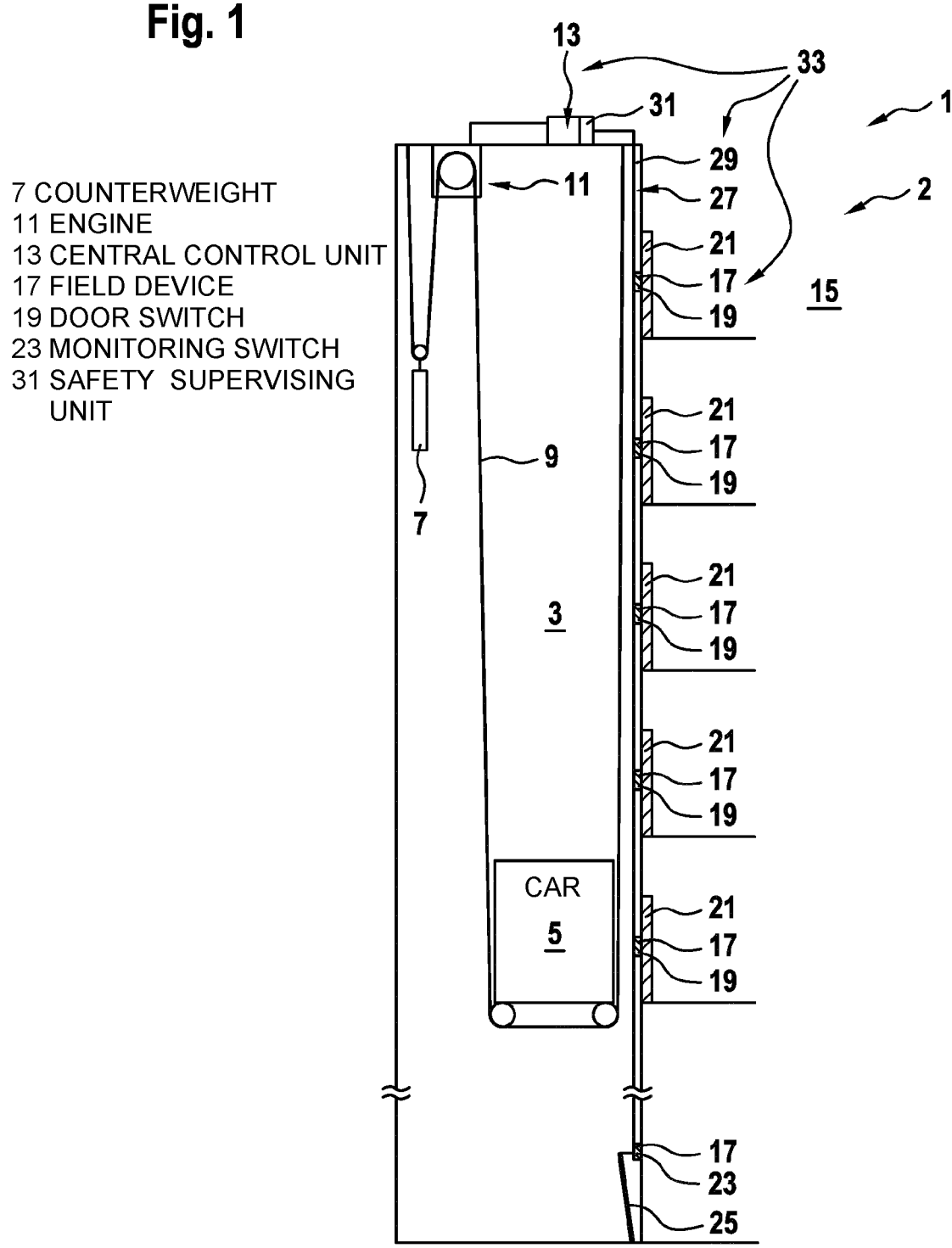
FIG. 1 shows a passenger transport system in the form of an elevator system according to an embodiment of the present invention.

FIG. 1 shows a passenger transport system 1 according to the invention in the form of an elevator system 2. The elevator system 2 comprises an elevator shaft 3, in which an elevator car 5 and a counterweight 7 can be moved. For that purpose, the elevator car 5 and the counterweight 7 are held on a rope- or belt-like suspension element 9 which can be displaced by an engine (drive) 11. A function of the elevator system 2 and particularly of an operation of the engine 11 and possibly also other components of the elevator system 2 can be controlled by means of a central control unit 13.

In order to be able to ensure a correct function and particularly a safety of the elevator system 2, a plurality of field devices 17 are incorporated in a structure 15 receiving the elevator system 2. The field devices 17 are distributed throughout the structure 15.

The field devices 17 can be, for example, door switches 19 which can monitor a closing state of doors 21, particularly of landing doors, of the elevator system 2. In that case, a door switch 19 acts as a type of sensor that can detect the current closing state of a door 21 assigned to said sensor, and as soon as the closing state changes, it can communicate said change as data telegram in the form of an instant message.

For example, a ladder 25 can be stored near a floor or a pit of the elevator shaft 3, the correctly stored positioning of which on a sidewall of the elevator shaft 3 is monitored, for example, by means of a monitoring switch 23 used as a field device 17.

The field devices 17 can be part of a safety circuit 27 of the elevator system 2 and, for example, be connected via a serial wiring 29 to the central control unit 13 or particularly to a safety supervising unit 31 (SSU) integrated therein. The wiring 29 and controllers provided in the field devices 17 and/or the central control unit 13 can together form a bus system 33, by means of which data telegrams can be exchanged between the participants of a data communication.

Each of the field devices 17 is designed to emit sensor signals generated by a sensor and/or to receive control signals to be implemented by an actuator. For example, a field device 17 itself can have a sensor and/or an actuator, and output the sensor signals generated by the sensor via external connections to other devices, particularly to the central control unit 13, or transmit via said external connections control signals received from other devices, particularly the central control unit 13, to the actuator, so that said actuator can implement the control commands contained therein. Alternatively, a field device 17 can serve merely as a node which, for example, can receive control signals from an external sensor or from another field device 17, and subsequently output said control signals to further devices, or which can receive control signals from further devices, and subsequently transmit them to an external actuator, so that said actuator can implement the control signals.

The central control unit 13 and/or at least some of the field devices 17 are designed to output different types of data telegrams via the bus system 33. The types of data telegrams are supposed to differ with respect to their urgency regarding the transmission from the central control unit 13 via the bus system 33 to one of the field devices 17, or conversely, from one of the field devices 17 to the central control unit 13.

For example, field devices 17 in the form of door switches 19 are supposed to be able to output instant messages which indicate a status change, for example, signal a transition from a closed door 21 to an open door 21, or vice versa. Particularly the information that a door 21 in an elevator system 2 is no longer closed but is now open is very important for a safe operation of the elevator system 2 because as a rule, a movement of the elevator car 5 must subsequently be prevented; therefore, such an instant message is supposed to be transmitted as quickly as possible, i.e. with high urgency, from the door switch 19 to the central control unit 13 or its SSU 31.

Field devices 17 in the form of door switches 19 can further be designed to periodically execute complex reviews of their functionalities. Such a review can be initiated spontaneously by a field device 17, for example, according to a predetermined schedule, or prompted by the central control unit 13 in predetermined intervals. Even though the correct functionality of the field device 17 is also important for a correct and safe functioning of the elevator system 2, as a sporadic test message, it is attributed generally with a lower urgency than the instant messages of the field device 17. This is the case particularly, when the complex review resulted in a correct functioning of the field device 17 and this is supposed to be reported to the control unit 13 merely as a formality.

As described, the sporadic test messages are basically assigned a low urgency. The field device 17 can particularly be designed such that, when a review reveals an incorrect functioning of the field device 17, the urgency of the sporadic test message is temporarily increased. It will be increased, until the sporadic test message can be distributed.

The field device 17 can particularly be designed such that it temporarily increases the urgency of the sporadic test message, when it was not possible to distribute the sporadic test message three times in a row. Once again, it will subsequently also be increased, until the sporadic test message can be distributed.

Furthermore, field devices 17, particularly in the form of door switches 19, are frequently designed to perform at least one simple review of their functionality at relatively closely spaced moments in order to ensure, for example, that the field device 17 is not prevented from communicating via the bus system 33 due to a mechanical interruption of a supply line. This can be particularly important for elevator systems 2 because each of a multiplicity of door switches 19 is usually connected to the central wiring 29 within the elevator shaft 3 by means of individual "stubs" in corresponding floors of the structure 15, and a local interruption of such a stub can generally only be detected by the SSU 31 by means of a short review of functional properties of the door switch 19. For example, upon request by the SSU 31 or in periodic intervals by itself, the door switch 19 is supposed to transmit a short presence signal which indicates to the SSU 31 that the door switch 19 is still connected to the bus system 33 and in principle appears to be functioning. The result of such a simple review of the functionality is supposed to be transmitted frequently, i.e. at relatively short intervals, as cyclic test message to the central control unit 13 but can be transmitted with a low urgency, particularly a lower urgency than that of the sporadic test messages. This applies particularly if the simple review resulted in a correct functioning of the field device 17 and this is supposed to be reported to the control unit 13 merely as a formality.

In this case, as described, the urgency of the sporadic test message can also be temporarily increased.

Figure 2:
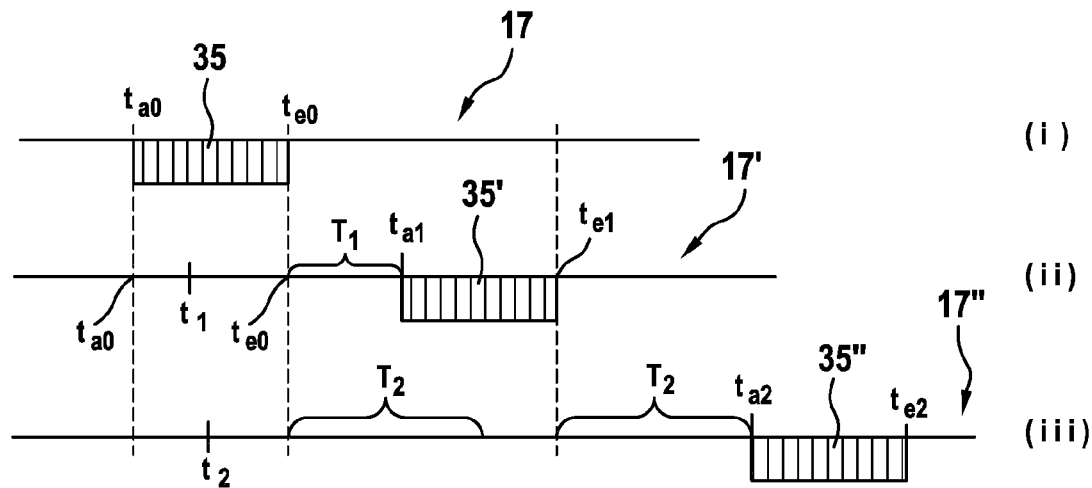
FIG. 2 illustrates the chronological sequence of data telegrams output by different field devices in a passenger transport system according to an embodiment of the present invention according to a first scenario.
Figure 3:
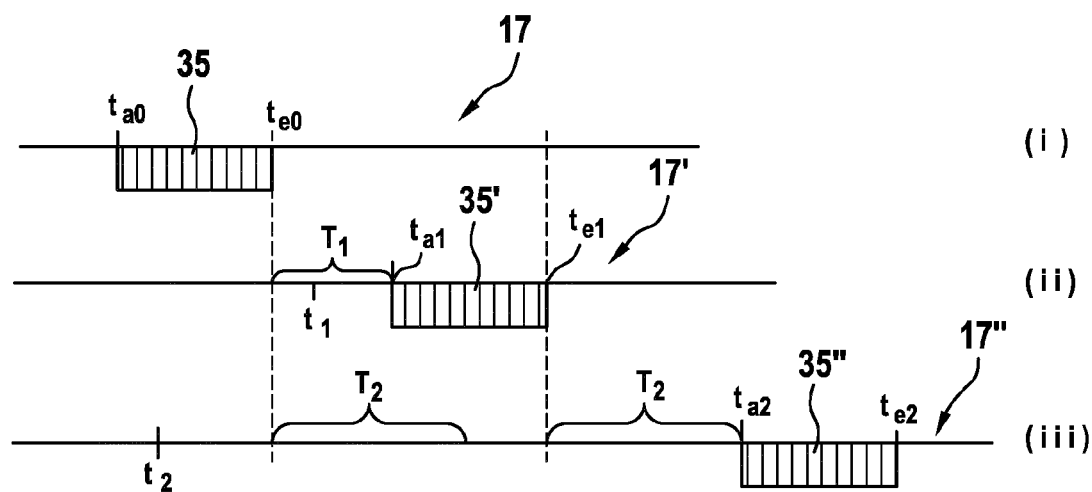
FIG. 3 illustrates the chronological sequence of data telegrams output by different field devices in a passenger transport system according to an embodiment of the present invention according to a second scenario.

FIGS. 2 and 3 show two different scenarios for transmitting data telegrams 35 from one of the field devices 17 to the control unit 13. Analogously, the data telegrams 35 can also be transmitted in reverse direction from the central control unit 13 to one of the field devices 17.

For that purpose, it is assumed that at the moment $t_{a0}$, a test telegram 35 is transmitted from any one of the field devices 17 to the control unit 13. The data transmission of this data telegrams 35 ends at the moment $t_{e0}$ (see time diagram (i)).

In the first scenario shown in FIG. 2, each of two further field devices 17', 17" attempts to transmit data telegrams 35', 35" via the bus system 33 during the data transmission of the data telegram 35. A first field device 17' (see time diagram (ii)) makes the attempt at the moment $t_1$, a second field device 17" (see time diagram (iii)) makes the attempt shortly after at a moment $t_2$. Both moments $t_1$, $t_2$ lie before the end $t_{e0}$, at which the data transmission of the previous data telegram 35 is concluded.

The two field devices 17', 17" each detect that currently a data transmission takes place via the bus system 33 and thus wait with the output of their own data telegrams 35', 35" to the bus system 33. At the moment $t_{e0}$, both field devices 17', 17" detect that the data transmission of the previous data telegram 35 is now concluded.

The data telegrams 35', 35" to be transmitted by the two field devices 17', 17" differ with respect to their urgency. For example, the first field device 17' attempts to transmit a data telegram 35' of an instant message, while the second field device 17" attempts to transmit a data telegram 35" of a sporadic test message.

The two field devices 17', 17" attempt to transmit their respective data telegrams 35', 35" via the bus system 33 after different waiting periods $T_1$, $T_2$. The waiting period $T_1$ of the more urgent data telegram 35' is shorter than the waiting period $T_2$ of the less urgent data telegram 35". At a data transfer rate of typically 9600 baud, the shorter waiting period $T_1$, for example, can be 3 ms, and the longer waiting period $T_2$, for example, can be 5 ms. After expiration of the shorter waiting period $T_1$, beginning at the end $t_{e0}$ of the previous data transmission, the first field device 17' begins at a moment $t_{a1}$ with the transmission of its data packet 35'. This subsequently ends at a moment $t_{e1}$. After expiration of the longer waiting period $T_2$, beginning at the end $t_{e0}$ of the previous data transmission, the second field device 17" also attempts to transmit its data packet 35". However, it detects that currently a data transmission via the bus system 33 is already taking place, namely, the data transmission of the more urgent data telegram 35'. The second field device 17" thus waits, until said data transmission is completed at the moment $t_{e1}$. From then on, it once more observes the waiting period $T_2$, before it begins at a moment $t_{a2}$ to send its own, less urgent data telegram 35". The sending of the data telegram 35" ends at a moment $t_{e2}$.

Even though both field devices 17', 17" initially attempted almost simultaneously at the moments $t_1$, $t_2$ to transmit their respective data telegrams 35', 35" via the bus system 33, it was possible to ensure that, due to the different waiting periods $T_1$, $T_2$, the more urgent data telegram 35' was sent first, and for the data transmission, it thus enjoyed a higher prioritization than the less urgent data telegram 35".

In the second scenario shown in FIG. 3, a first field device 17' attempts to output an urgent data telegram 35' via the bus system 33 only at a moment $t_1$, after the data transmission of a previous data telegram 35 was concluded at the moment $t_{e0}$ (see time diagram (ii)). At an earlier moment $t_2$, particularly prior to the conclusion of the data transmission of the previous data telegram 35 at the moment $t_{e0}$, another field device 17" already attempts to transmit a less urgent data packet 35", but detects that currently a data transmission via the bus system 33 is already taking place and thus initially awaits its conclusion. Starting at this end $t_{e0}$, it additionally waits for its relatively long waiting period $T_2$ (see time diagram (iii)). The first field device triggered at a later moment $t_1$, retrospectively to the end $t_{e0}$, also waits for the duration of its waiting period $T_1$ which, however, is significantly shorter than the waiting period $T_2$ of the less urgent data packet 35". Therefore, the first field device 17' already starts at the moment $t_{a1}$ to deliver its urgent data telegram 35'. Once its data transmission is concluded at the moment $t_{e1}$, the second field device 17" once again waits for the duration of its waiting period $T_2$, before it begins at the moment $t_{a2}$ to transmit its less urgent data telegram 35". The transmission of the data telegram 35" ends at a moment $t_{e2}$.

By observing urgency-dependent waiting periods $T_1$, $T_2$, a prioritization between the data telegrams 35', 35" with different degrees of urgency can also be effected in this second scenario.

It is also possible that the entire waiting period for the transmission of the data telegram 35' by the first field device 17' consists of two parts. In this case, the first part would consist of the interval between the end $t_{e0}$ of the data transmission of the previous data telegram 35 and the moment $t_1$, at which the first field device 17' intends to output an urgent data telegram 35' via the bus system 33. The second part would consist of the waiting period $T_1$ according to FIG. 3. When compared to the drawing in FIG. 3, the data telegram 35' would thus be sent later by the described first part of the waiting period.

The prioritization method proposed herein by means of urgency-dependent waiting periods $T_1$, $T_2$ can be executed with relatively inexpensive hardware, and can thus be implemented simply and cost-efficiently in a passenger transport system 1, particularly an elevator system 2.

Finally, it must be noted that terms, such as "having," "comprising," etc. do not exclude any other elements or steps, and terms, such as "an" or "a" do not exclude a multiplicity. It must further be noted that features described with reference to one of the above embodiments can also be used in combination with other features of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A passenger transport system comprising:
   a central control unit for controlling functions of the passenger transport system;
   a plurality of field devices that are spatially distributed within the passenger transport system;

a bus system for transmission of data between the central control unit and the field devices, wherein each of the field devices outputs the data via the bus system to at least one of the central control unit and another of the field devices, and wherein the central control unit outputs the data via the bus system to at least one of the field devices;

wherein the data includes different types of data telegrams that differ with respect to urgency;

wherein the central control unit and the field devices detect a current data transmission via the bus system and detect a conclusion of the current data transmission;

wherein the central control unit and the field devices output the data telegrams via the bus system only when no data transmission is occurring via the bus system and after a predetermined waiting period has elapsed since the conclusion of a previous data transmission via the bus system;

wherein each of the types of the data telegrams is assigned a different individual waiting period on the basis of the respective urgency; and wherein the central control unit and the field devices vary the urgency assigned to the type of the data telegrams on a basis of current conditions.

2. The passenger transport system according to claim 1 wherein at least one of the central control unit and the field devices temporarily increases the urgency assigned to one of the data telegrams if a predetermined number of attempts to transmit the one data telegram have failed.

3. The passenger transport system according to claim 1 wherein the bus system, the central control unit, and the field devices communicate the data at a specific data transfer rate, and wherein the individual waiting periods of the types of the data telegrams with different urgencies differ by at least a duration required for transmitting one individual data unit of the data at the specific data transfer rate.

4. The passenger transport system according to claim 3 wherein the different individual waiting periods differ by at least four times the duration required for transmitting one individual data unit at the specific data transfer rate.

5. The passenger transport system according to claim 1 wherein the bus system, the central control unit, and the field devices communicate the data at a data transfer rate of 9600 baud, and wherein the different individual waiting periods differ by at least 1 ms.

6. The passenger transport system according to claim 1 wherein at least two of the field devices output via the bus system ones of the data telegrams that differ with respect to their urgency.

7. The passenger transport system according to claim 1 wherein the field devices output the data telegrams of the following types:

instant messages that indicate a change of state at an associated one of the field devices and which have assigned a high urgency one of the individual waiting periods;

sporadic test messages that indicate a result of a complex review of a functionality of an associated one of the field devices and which have assigned a medium urgency one of the individual waiting periods that is longer than the high urgency individual waiting period; and cyclic test messages that indicate a result of a simple review of a functionality of an associated one of the field devices and which have assigned a low urgency one of the individual waiting periods that is longer than the medium urgency individual waiting period.

8. The passenger transport system according to claim 7 wherein at least one of the central control unit and the field devices outputs the data telegrams having the high urgency individual waiting period less frequently via the bus system than the data telegrams having the low urgency individual waiting period.

9. The passenger transport system according to claim 1 wherein the central control unit and the field devices verify, when attempting to output one of the data telegrams, whether a different one of the field devices or the control unit is simultaneously attempting to output another one of the data telegrams via the bus system and in response to the verification decide using prioritization criteria which of the data telegrams will be output first via the bus system.

10. The passenger transport system according to claim 1 wherein at least one of each of the field devices outputs as the data sensor data generated by a sensor to the central control unit, and the central control unit outputs as the data control data to be implemented by an actuator associated with one of the field devices.

11. A method for transmitting data telegrams via a bus system between a central control unit and one or more field devices within a passenger transport system, wherein the data telegrams include different types with respect to urgency, the method comprising the steps of:

detecting whether a current data transmission via the bus system is taking place, and when a previous data transmission via the bus system was concluded;

outputting one of the data telegrams of a specific one of the types via the bus system only if no current data transmission via the bus system is taking place, and after a waiting period has elapsed since a conclusion of the previous data transmission; and wherein each of the types of the data telegrams is assigned an individual waiting period on a basis of the respective urgency, and the urgency of the types of the data telegrams is varied on a basis of current conditions.

12. The method according to claim 11 wherein the urgency of one of the data telegrams is temporarily increased if a predetermined number of attempts to transmit the one data telegram have failed.

13. The method according to claim 11 wherein data communication via the bus system takes place at a specific data transfer rate, and wherein the individual waiting periods of the types of the data telegrams with different urgencies differ at least by a duration required for transmitting an individual data unit at the specific data transfer rate.

14. The method according to claim 13 wherein the individual waiting periods with different urgencies differ by at least four times the duration required for transmitting the one individual data unit at the specific data transfer rate.

15. A non-transitory computer program product, having commands readable by a computer, which commands instruct the computer to control the passenger transport system by the method according to claim 11.

16. A non-transitory machine-readable medium having a stored computer program product according to claim 15.

* * * * *